United States Patent [19]

Belfort et al.

[11] 4,274,831

[45] Jun. 23, 1981

[54] PROCESS FOR DYEING OR PRINTING SYNTHETIC FIBER MATERIALS BY MEANS OF DISPERSE DYES, AND COLORANT COMPOSITIONS UTILIZABLE FOR THIS PURPOSE

[75] Inventors: Gerard L.A. Belfort, Oissel; Daniel P. A. Richer, Bosc Roger en Roumois, both of France

[73] Assignee: Produits Chimiques Ugine Kuhlmann, Courbevoie, France

[21] Appl. No.: 921,040

[22] Filed: Jun. 30, 1978

[30] Foreign Application Priority Data

Jul. 28, 1977 [FR] France .................................. 77 23221

[51] Int. Cl.$^3$ ...................... D06P 3/872; D06P 3/874; D06P 1/673; D06P 1/653
[52] U.S. Cl. .......................................... 8/532; 8/533; 8/623; 8/624; 8/628; 8/629; 8/635
[58] Field of Search ............... 8/21 B, 21 C, 166, 174, 8/82, 30, 635, 623, 624, 629, 628, 532, 533

[56] References Cited

U.S. PATENT DOCUMENTS

| | | | |
|---|---|---|---|
| 2,833,613 | 5/1958 | Hallda et al. | 8/55 |
| 2,923,593 | 2/1960 | Olpin et al. | 8/82 |
| 3,893,806 | 7/1975 | Finch et al. | 8/174 |
| 4,026,914 | 5/1977 | Zirngibl | 8/179 |
| 4,078,885 | 3/1978 | Opitz et al. | 8/21 B |
| 4,082,503 | 4/1978 | Hertel | 8/82 |

FOREIGN PATENT DOCUMENTS

| | | |
|---|---|---|
| 2016980 | 5/1970 | France . |
| 51-40499 | 4/1976 | Japan ............................................. 8/82 |
| 938414 | 10/1963 | United Kingdom . |
| 972005 | 10/1964 | United Kingdom . |
| 1182445 | 2/1970 | United Kingdom ...................... 8/21 B |

OTHER PUBLICATIONS

Millson, H. Amer. Dyestuff Reporter Jan. 30, 1956, pp. 66–67.
Chem. Abst. 84:166168v 1976.
Dupont Bulletin D288 11/1975, pp. 5–7.
Mellor, J. W. Mellor's Modern Inorganic Chemistry Longman's, N.Y. 1961, pp. 269–270.
Schnider, E. F. Amer. Dyestuff Reporter, May 13, 1963, pp. 370–376.
Chem. Abstracts vol. 85:69022f.

*Primary Examiner*—Joseph L. Schofer
*Assistant Examiner*—Maria Parrish Tungol
*Attorney, Agent, or Firm*—Beveridge, Degrandi, Kline & Lunsford

[57] ABSTRACT

A process of dyeing or printing of synthetic fiber materials by means of disperse dyes carried out in the presence of at least one derivative of a metal having an atomic number in the range of 24 through 30 to prevent or diminish the degradation of the dye during the dyeing or printing process, and ready-to-use colorant compositions for this process.

10 Claims, No Drawings

PROCESS FOR DYEING OR PRINTING SYNTHETIC FIBER MATERIALS BY MEANS OF DISPERSE DYES, AND COLORANT COMPOSITIONS UTILIZABLE FOR THIS PURPOSE

BACKGROUND OF THE INVENTION

1. Field of the Invention

The present invention concerns the dyeing and printing of synthetic fibers by means of disperse dyes, as well as the preparation of ready-to-use colorant compositions containing disperse dyes.

2. Description of the Prior Art

It is well known that during the process of dyeing, many disperse dyes undergo a chemical attack by the dyeing medium, this attack being generally considered as a hydrolysis, a reduction or an oxidation of certain less stable groups in the dye molecule. A detailed list of such dyes can be found, for example, in the "Color Index," Vol. 2, Third Edition, pages 2479-2791, and also in the paper of B. L. Neal, given on September 21, 1973 at the National Convention of the AATCC, entitled "Characteristics of Disperse Dyestuffs for Dyeing Texturized Polyester."

It is likewise known that the appearance of these secondary reactions, which are undesirable at the moment of dyeing, depends from a practical point of view on the nature of the auxiliaries currently employed in the dyeing industry, on the temperature, and particularly on the pH of the dyebath. Finally, certain fiber blends have been cited as being responsible for a marked degradation of the dyestuffs at the boil. There results from this a reduction in the tinctorial yield and/or a variation in shade of the dyed materials.

This sensitivity is thus a serious disadvantage which limits the utilization of certain disperse dyes, or which even prevents the utilization of new dyes which are too sensitive although in other respects entirely noteworthy.

Faced with this situation, the dyestuff producers more often than not have open to them only the course of recommending to users particular, and often draconian, conditions of application, principally as concerns the pH level in use, which has to be regulated in a precise manner. Many examples can be found of this in the commercial documentation of the different dyestuff manufacturers.

It has likewise been proposed in French Pat. No. 2,055,011 filed July 10, 1970 to use in the dyebaths certain water-soluble esters of carboxylic acids. However, these organic compounds are used in large amounts, such that this does not permit the preparation of ready-to-use colorant compositions, and this considerably increases the user's costs for the dyeing operation.

SUMMARY OF THE INVENTION

It has now been found that the utilization of derivatives of metals having an atomic number in the range of 24 through 30 during the dyeing or printing of materials with a basis of synthetic fibers by means of disperse dyes which are easily degraded, enables articles dyed or printed to constant and reproducible shades to be obtained regularly and without special precautions. It has in fact been observed that in a completely unexpected manner, these derivatives have an excellent effect on the chemical stability of the disperse dyes such that, during the entire process of dyeing or printing, degradation of the dye occurs only to a slight degree or not at all.

The present invention thus resides in a process of dyeing or printing materials with a basis of synthetic fibers by means of disperse dyes wherein the operation is carried out in the presence of at least one derivative of a metal having an atomic number in the range of 24 through 30.

The present invention likewise resides in colorant compositions which can be utilized for the carrying out of the process according to the invention, characterized in that they contain at least one metallic derivative as defined above, as well as the preparation of such compositions.

DESCRIPTION OF THE PREFERRED EMBODIMENTS

As metallic derivatives conforming to the invention, there are preferred those of the following metals: zinc, manganese, nickel and cobalt. The metallic derivative is preferably a salt which can be an inorganic salt (in particular the chloride, sulfate, nitrate, phosphate, etc.) as well as any organic salt, in particular a salt of a carboxylic acid of low molecular weight (for example, the formate, acetate, oxalate, etc.) or a salt of an anionic dispersant. From the practical point of view, the actual nature of the combination used has no influence on the result. The utilization of several metallic derivatives in a mixture is generally unnecessary, but nevertheless is still in conformity with the invention.

The synthetic fibers concerned in the process according to the invention are fibers of cellulose esters such as cellulose acetate and triacetate fibers, fibers of synthetic polyamides, fibers of polyurethane, polyolefins or polyacrylonitrile, and above all, fibers of linear polyesters such as those obtained by condensation of isophthalic or terephthalic acid with ethylene glycol, or by condensation of isophthalic or terephthalic acid with 1,4-bis(hydroxymethyl)-cyclohexane, as well as the copolymers of isophthalic and terephthalic acids with ethylene glycol. These materials can likewise be utilized in the form of blends: polyacrylonitrile/polyester, polyamide/polyester, polyester/viscose, and in particular mixed blends: polyester/cotton and polyester/wool. Finally, the material to be dyed can be in any known form: flocks, fabric, spun yarn, bobbins, etc.

The disperse dyes, insoluble or difficultly soluble in water at ambient temperature, which can benefit from the new technique according to the present invention, include all the disperse dyes termed "plasto-soluble," having no free sulfonic groups and suitable for dyeing synthetic fibers, such as, by way of example, those references in "Color Index," Third Edition, 1971, in the section "Disperse Dyes" and belonging to the following classes: acridine, nitro, methine and polymethine, styryl and azostyryl, oxazine dyes, dyes of the xanthen, aminonaphthoquinone and coumarin series, and chiefly the anthraquinone and azo dyes. Mixtures of such dyes can likewise be utilized in conformity with the invention. These dyes are employed in a finely divided form, either in the state of aqueous dispersions, or in the solid state.

The quantity of metallic derivative to be used varies within wide limits, and depends in particular on the nature of the dye and that of the metallic derivative utilized. The quantity necessary to obtain an optimum stabilizing effect can easily be determined by one skilled in the art by means of preliminary tests which consist, for a given dye and for the desired conditions of application, of varying the proportion of metallic derivative and observing what proportion gives the optimum effect.

The metallic derivative according to the invention can be added directly to dyebaths or printing pastes, during their preparation. It can likewise be associated in advance with the disperse dyes in the form of ready-to-use colorant compositions (pastes or powders).

These colorant compositions, which constitute a preferred embodiment of the invention, contain at least one disperse dye, at least one surface-active dispersant, at least one metallic derivative such as defined above, and possibly other usual auxiliaries such as, for example, wetting agents, thickeners, etc. They can be prepared by grinding the constituents mentioned above in the usual grinding apparatus, in particular in wet grinders such as, for example, ball mills, impact mills, etc. If required, drying can follow.

In these colorant compositions, a proportion of metallic derivative between 1% and 10% by weight (expressed in terms of the metal) in relation to the dye is generally sufficient. As has previously been disclosed, the optimum proportion depends on the nature of the dye and can be determined very easily.

The surface-active dispersants, in the meaning of the invention, correspond to the usual dispersing agents utilized as colloidal protectors. They can be of very varied nature and origin. A class which it is preferred to employ is that of the anionic surface-active dispersants such as, for example, the alkali salts of fatty acids of high molecular weight, the condensation products of naphthalenesulfonic acid with formaldehyde or their alkali salts, or lignosulfonates. The quantity of dispersant to be included can vary within wide limits; the ratio of the weight of pure dye to the dispersant is generally between 1/0.5 and 1/5. When the metallic derivative is a salt of an anionic dispersant, the presence of other dispersants is not critical.

For preparation of the dyebaths, it is advantageous to utilize colorant compositions according to the invention which are directly ready-to-use and merely require a simple dilution with water. There can, however, be added to the bath thus prepared, if required, and in accordance with the dyeing method utilized, usual auxiliaries: for example, wetting agents, dyeing accelerators, thickeners, salts such as ammonium acetate or sulfate, as well as dyes for wool or cotton if it is desired to dye mixed fibers. Although not critical according to the new technique, the dyebath can likewise contain substances having an acid reaction, and more particularly lower aliphatic carboxylic acids, such as acetic, oxalic, or tartaric acid, in order to regulate the value of pH within the range between 3 and 8.

The dyebaths can likewise be prepared from commercial disperse dyes. In this case, it is sufficient to add to the bath during its preparation, in addition to the usual auxiliaries previously mentioned, at least one metallic derivative conforming to the invention, as a dye stabilizer. The quantity of the metallic derivative to be used in this case likewise depends on the intensity of color desired. In general, a proportion of metallic derivative between 0.2% and 2% by weight (expressed as metal) in relation to the commercial dye utilized is found to be sufficient. The optimum proportion can easily be determined by proceeding as indicated above.

The dyebaths prepared either by starting from the colorant compositions according to the invention or by addition of the metallic derivative directly to the baths, can be utilized according to any of the usual techniques of dyeing, whether continuous or discontinuous. They are in particular well suited for dyeing by exhaustion, and more especially according to the process termed "high temperature" in circulation apparatus able to withstand the pressure at temperatures between 105° and 140° C.

The dyebaths prepared according to the invention can likewise be used to dye synthetic fiber materials in continuous lengths, that is, by padding, expression to the desired content, then by a thermal treatment consisting, for example, for steaming at temperatures of 98° to 105° C. with neutral saturated steam, or in a thermal fixation at 180°–200°.

Finally, the new colorant compositions are particularly well suited to application by printing, since they can be directly utilized immediately after addition of the usual auxiliaries.

The following examples illustrate the invention without limiting it. Except where otherwise defined, the parts and percentages are to be understood as being by weight, and the temperatures in degrees Celsius.

EXAMPLE 1

In a sand mill, there are milled until a fine dispersion (between 1 and 5 $\mu$) is obtained, 20 parts of the dye 2-(2-acetylamino-4-diethylamino-phenylazo)-3,5-dinitro-benzonitrile with 10 parts of neutral sodium lignosulfonate, 2 parts of manganese (II) sulfate monohydrate, and 68 parts of water. After separation of the sand by mechanical means, there is obtained a colorant composition which can be utilized directly for the preparation of a dyebath.

For this purpose, 0.3 parts of the preceding colorant composition are introduced into 300 parts of water containing 0.28 parts of ethoxylated castor oil, with 40 moles of ethylene oxide, and 0.02 parts of sodium laurylsulfate. The pH value of the bath, which is about 7, is not adjusted.

15 Parts of polyester fabric are then added, and the temperature is then raised to 140° C. during 45 minutes. Dyeing further proceeds for 60 minutes at 140° C. After cooling, the dyed material is carefully rinsed and then dried. There is thus obtained a bright reddish blue dyeing with a high color yield. An entirely analogous result is obtained if the manganese sulfate in the colorant composition as above is replaced by 2 parts of cobalt (II) sulfate monohydrate, or also by 3.4 parts of zinc sulfate heptahydrate.

In the absence of manganese, cobalt or zinc sulfate, the dyeing obtained, although otherwise carried out under the same conditions, is greenish blue, distinctly duller, and gives a very inferior color yield. This is a result of the fact that part of the dye initially in the bath is later degraded during the heating; to obtain a dyeing having a brightness and intensity comparable to that obtained with the manganese, cobalt or zinc sulfate, it would have been absolutely necessary to bring the bath pH precisely to 4.5 so as to minimize to the maximum degree the phenomenom of degradation.

EXAMPLE 2

A dyebath is prepared by introducing 1.8 parts of the dye 2-[N,N-bis(2-acetoxyethyl)-4-amino-phenylazo]-5-nitro-benzonitrile of 30% [titer], into 1,800 parts of water containing 1.6 parts of ethoxylated castor oil, with 40 moles of ethylene oxide, and 1.5 parts of the sodium salt of dinaphthylmethane disulfonic acid. The bath is separated into six equal fractions, and each fraction is brought to a respective pH value 3, 4, 5, 6, 7 and 8.5 by means of appropriate alkaline or acid reagents.

15 Parts of a polyester fabric are then introduced into each bath, which is then heated to 140° during 45 minutes; this temperature is maintained for a further 60 minutes.

After cooling, rinsing and drying of each dyed fabric, a comparative examination of the series enables considerable anomalies to be observed: only the dyeings carried out at pH 4 and 5 have given a practically identical deep red coloration. In comparison, the fabric dyed at pH 3 possesses a much lower intensity of color, the drop in yield being estimated at about 10%; for the dyeings carried out at pH 6, 7 and 8.5, a progressive deterioration of the color intensity is observed, and it can be estimated to be 50% for the most alkaline pH. Finally, it is noted that all the degraded dyeings appear notably bluer and duller.

On the contrary, when Example 2 is repeated under identical conditions, except that 0.019 parts of cobalt sulfate monohydrate are added to each fraction of the bath before the pH is adjusted, it is then observed that the different dyed materials are completely uniform both in level of shade and in intensity, the latter being equivalent to slightly better than that obtained at pH 4 and 5 in the initial experiment. This demonstrates that the addition of cobalt sulfate to the dyebaths enables a considerable stabilization of the dye molecule to be obtained.

EXAMPLE 3

To 800 parts of an aqueous solution at 90° containing 231 parts of dinaphthylmethanedisulfonic acid in the form of a sulfuric acid solution derived from the sulfonation of naphthalene and its condensation with formaldehyde, there are added 79 parts of calcium carbonate, so as to obtain a pH of 4.5. The insoluble calcium sulfate is filtered off. The filtrate containing calcium dinaphthylmethane disulfonate is then treated with 91.3 parts of manganese (II) sulfate monohydrate in solution in 200 parts of water. The calcium sulfate formed is again filtered off, and the filtrate is then evaporated to dryness. There are thus obtained 255 parts of manganese dinaphthylmethane disulfonate.

Into a sand mill there are introduced 127 parts of water, 6 parts of manganese dinaphthylmethane disulfonate prepared as above, 20 parts of sodium lignosulfonate, and 43.4 parts of the dye 4-(4-chloro-2-nitrophenylazo)-3-carbamoyl-1-phenyl-5-pyrazolone. After milling as in Example 1 and then mechanical separation of the sand, a stable suspension of the dye is obtained.

A dyebath is prepared by introducing 0.6 parts of the preceding colorant composition into 300 parts of water containing 0.28 parts of ethoxylated castor oil and 0.02 parts of sodium laurylsulfate. The bath pH is about 8.5. 15 Parts of polyester fibers are introduced into the bath, and dyeing proceeds under the same conditions as in Example 1. A brilliant golden yellow dyeing is obtained, with a color yield higher by 15% than a dyeing carried out under the identical conditions but in the absence of manganese dinaphthylmethane disulfonate.

What is claimed is:

1. A process for dyeing materials containing synthetic fibers by means of disperse dyes which comprises carrying out the dyeing by the exhaustion method in the presence of at least one metallic salt of an inorganic or organic acid, the metal having an atomic number in the range of 24 through 30, said metallic salt being added in an amount of 0.2 to 2% by weight expressed as metal in relation to the disperse dye.

2. The process according to claim 1 wherein the metallic salt is an inorganic or organic salt of nickel, cobalt, zinc or manganese.

3. A process according to claim 1 wherein the metallic salt is a chloride, sulfate, nitrate, phosphate, formate, acetate or oxalate or a salt of an anionic dispersant.

4. The process according to claim 2 wherein the metallic salt is a salt of an anionic dispersant.

5. The process according to claim 4 wherein fibers of linear polyesters are dyed.

6. The process according to claim 4 for the dyeing of mixed fibers in a dyebath wherein the dyebath also contains at least one dye for wool or cotton.

7. The process according to claim 1 wherein the metallic derivative is manganese sulfate, cobalt sulfate, zinc sulfate or manganese dinaphthylmethane disulfonate.

8. The process according to claims 1, 2 or 7 wherein fibers of linear polyesters are dyed.

9. The process according to claim 8 for the dyeing of mixed fibers in a dyebath wherein the dyebath also contains at least one dye for wool or cotton.

10. The process according to claims 1, 2 or 7 for the dyeing of mixed fibers in a dyebath wherein the dyebath also contains at least one dye for wool or cotton.

* * * * *